UNITED STATES PATENT OFFICE.

LEO VIGNON, OF LYONS, FRANCE.

SULPHO-ALPHA-NAPHTHOL COLORING COMPOUND.

SPECIFICATION forming part of Letters Patent No. 310,155, dated December 30, 1884.

Application filed December 28, 1883. (No specimens.)

*To all whom it may concern:*

Be it known that I, LEO VIGNON, a citizen of the Republic of France, residing at Lyons, France, have made certain new and useful Improvements in the Manufacture of Coloring-Matters, of which the following is a specification.

This invention relates to the preparation of a new series of coloring-matters by causing certain reactions on the different sulpho-conjugated derivatives of alpha-naphthol by the diazo compounds obtained with the amines and their sulpho-conjugated derivatives, in the manner more fully hereinafter explained.

The sulpho-alpha-naphthols may be prepared by either of the following methods, as may prove convenient, viz: first, by treating a mixture of one part of alpha-naphthol with monohydrated sulphuric acid at a temperature not exceeding 25° centigrade until the desired reaction takes place; second, by subjecting such mixture to the action of heat at 80° centigrade for three hours; third, by substituting fuming sulphuric acid containing twenty per cent. of the anhydrous for the monohydrated acids in the previous mixtures.

The diazo-benzole is formed as follows: With one hundred parts of water are mixed thirty parts of commercial hydrochloric acid and ten parts of aniline. This mixture is cooled down to zero centigrade with ice. There is then added 7.42 parts of pure sodium nitrite dissolved in water, and the mixture is kept at a temperature of 2° to 3° centigrade, when the diazo-benzole forms instantly.

The preparations above described are not, *per se*, a part of my invention, as the same as well as the method of preparation have heretofore been known.

The sulpho-naphthol as prepared by either of the previous processes is transformed into a sodium sulpho-naphthol, and to the same is added in slight excess sodium carbonate, (or ammonium hydrate,) and the mixture is cooled down to about zero centigrade and the diazo-benzole poured in, taking care to agitate the mixture violently during the mixing. The liquor should be neutral or alkaline. The color forms instantaneously, and is collected by precipitation or by evaporating the solution.

What I claim as my invention is—

As a new product, the coloring-matter which results from the reaction of a sodium sulpho-alpha-naphthol rendered slightly alkaline by sodium carbonate or ammonia hydrate upon diazo-benzole, substantially as specified.

In testimony whereof I have signed this specification in the presence of two subscribing witnesses.

LEO VIGNON.

Witnesses:
E. COPPEN,
EUG. DUBOIS.